(12) United States Patent
Hammam et al.

(10) Patent No.: US 8,560,638 B2
(45) Date of Patent: Oct. 15, 2013

(54) SYSTEMS AND METHODS FOR CHANGING THE ADDRESS OF AN INTERFACE

(75) Inventors: Tarik Hammam, Kista (SE); Anders Franzén, Trangsund (SE); Matthias Holmqvist, Naoka (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 828 days.

(21) Appl. No.: 12/356,875

(22) Filed: Jan. 21, 2009

(65) Prior Publication Data

US 2010/0185755 A1   Jul. 22, 2010

(51) Int. Cl.
*G06F 15/16* (2006.01)

(52) U.S. Cl.
USPC ........................................ 709/219

(58) Field of Classification Search
USPC ................................ 709/219, 220
See application file for complete search history.

(56) References Cited

U.S. PATENT DOCUMENTS

| | | | |
|---|---|---|---|
| 6,073,172 A * | 6/2000 | Frailong et al. | 709/222 |
| 6,301,612 B1 * | 10/2001 | Selitrennikoff et al. | 709/220 |
| 7,529,815 B2 * | 5/2009 | Droms | 709/220 |
| 2007/0091887 A1 | 4/2007 | Ko et al. | |
| 2008/0095138 A1 | 4/2008 | Wu et al. | |

OTHER PUBLICATIONS

FreeBSD Diary, "Managing an IP address change", Oct. 4, 2002, 7 pages, XP002580089.
International Search Report and Written Opinion from PCT Application No. PCT/IB2010/000063, dated May 17, 2010, 8 pages.
International Preliminary Report on Patentability issued on Jul. 26, 2011 in International Application No. PCT/IB2010/000063, 6 pages.

* cited by examiner

*Primary Examiner* — Adnan Mirza
(74) *Attorney, Agent, or Firm* — Rothwell, Figg, Ernst & Manbeck, P.C.

(57) ABSTRACT

In one aspect, the invention provides a method of reconfiguring a network interface. In some embodiments, this method includes the following steps: receiving information indicating that an operator desires to remove a first network address from the network interface and assign a second network address to the network interface; and in response to receiving the information, providing a notification to at least one computer program executing in the node such that the computer programs can take a necessary measure (e.g., close a connection that uses the first network address).

16 Claims, 10 Drawing Sheets

SYSTEMS AND METHODS FOR CHANGING THE ADDRESS OF AN INTERFACE

TECHNICAL FIELD

The present invention relates to the field of computer networking. In one aspect, the invention relates to systems and methods for changing the network address of an interface.

BACKGROUND

Typically, a communication device (e.g., computer or other communication device) connects to a network (e.g., an Internet Protocol (IP) network) via one or more interfaces. Each interface is assigned a network address (e.g., an IP address). When an administrator (or "operator") changes the network address of an interface, any currently established connections using that address may not function correctly. Accordingly, changing the IP addresses of an interface usually requires service disrupting measures (e.g., a system restart or at least a process restart). While it is possible to add an alias address to an interface, it is still problematic to remove the primary address without impacting negatively on the applications running in the device that are using the primary address.

What is desired are improved systems and methods for changing the address of an interface.

SUMMARY

In one aspect, the invention provides a method of reconfiguring a network interface. In some embodiments, this method includes the following steps: receiving information indicating that an operator desires to remove a first network address from the network interface and assign a second network address to the network interface; and in response to receiving the information, providing a notification to at least one computer program executing in the node such that the computer programs can take a necessary measure.

In some embodiments, the information comprises a command received from an external node or directly from the operator, and the first network address is not removed from the network interface until after the notification is provided to the executing computer program.

In some embodiments, the information includes the second network address and the notification provided to the computer program includes the second network address. The information may further include the first network address and/or a subscriber identifier, wherein the computer program is associated with the first network address and/or the subscriber identifier.

In some embodiments, the information includes (a) the second network address and (b)(1) a subscriber group identifier or (b)(2) the first network address, wherein a set of two or more computer programs is associated with the subscriber group identifier and/or the first network address. The method may further include providing the notification to at least a subset of the computer programs included in the set of computer programs.

The method may also include the step of monitoring connections that are using the first network address, and the step of monitoring the connections comprises detecting when a connection using the first network address is closed, and the method may further include removing the first network address from the network interface only after (1) all of the monitored connections have been closed or (2) a predetermined period of time has elapsed.

In some embodiments, the necessary measure includes sending a signal to a second computer program.

In some embodiments, the step of receiving the information that indicates that an operator desires to remove the first network address from the network interface and assign a second network address to the network interface comprises: (1) receiving, from a protocol stack, information indicating that an operator has removed the first network address from the network interface and added the second network address to the network interface; and (2) after step (1), receiving, from the protocol stack, information indicating that an operator has assigned the first network address to the network interface as an alias.

In another aspect, the present invention provides a computer program product comprising a computer readable medium storing address change service software for providing a notification to a computer program in response to an event. In some embodiments, the event is one of: (a) detecting that an operator has assigned a new network address to a network interface to which a previous network address was assigned and (b) receiving a command to assign the new network address to the network interface, and the notification includes the new network address.

In some embodiments, the computer readable medium further stores interface monitoring software for (a) detecting (i) the assigning of the new network address to the network interface and (ii) the assigning of the previous network address to the network interface as an alias, and (b) triggering the address change service software to provide the notification to the computer program in response to the interface monitoring software detecting said events (i) and (ii). In these embodiments, the computer readable medium may further store connection tracking service software configured to monitor connections that are using the previous network address in response to event (a) or (b). The connection tracking service software may comprise computer code for detecting when a connection closes. The address change service software may further be configured to remove the previous network address from the network interface in response to the software for monitoring the connections detecting that all of the monitored connections are closed.

In some embodiments, the computer readable medium further stores computer code configured to receive, directly from an operator or from an external application, a command to assign the new network address to the network interface. The computer readable medium may further store computer code that is configured to assign the new network address to the network interface in response to the receipt of the command. The computer readable medium may further store computer code that is configured to remove the previous network address from the network interface in response to (a) a timer expiring or (b) the closing of all connections that were using the previous network address.

In some embodiments, the command includes a subscriber identifier that is associated with only the executing computer program to which the notification is provided or a subscriber group identifier that is associated with a set of two or more executing computer programs, said set including the executing computer program to which the notification is provided. The computer code for providing the notification may be configured to provide the notification to each computer program identified by the subscriber group identifier.

In some embodiments, the computer program is configured to send a signal to a second computer program in response to receiving the notification.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Figure 1:
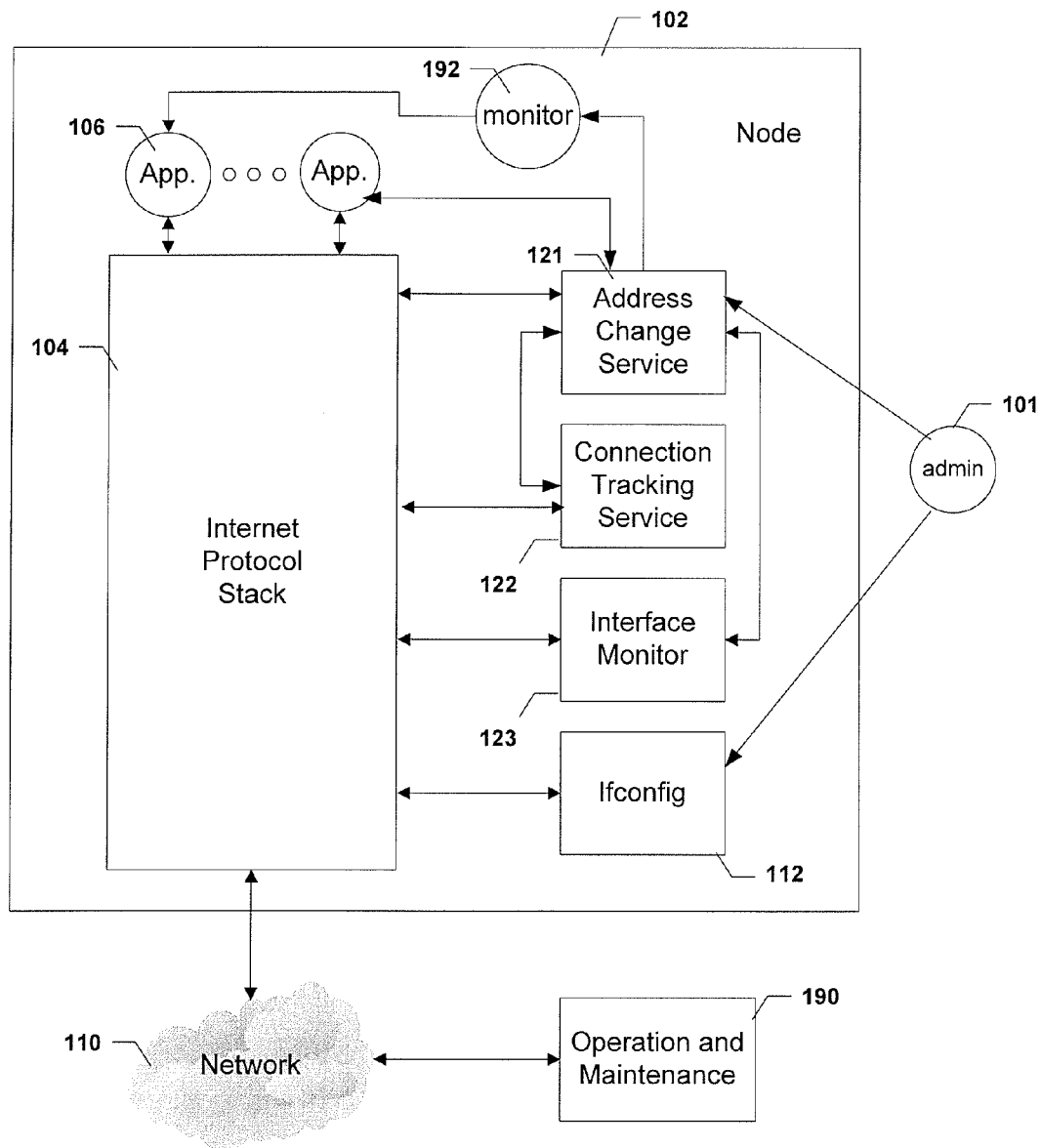
FIG. 1 is a functional block diagram of a communication device according to some embodiments of the invention.

Referring to FIG. 1, FIG. 1 is a functional block diagram of a communication device (or "node") 102 according to some embodiments of the invention. As illustrated, communication device 102 includes one or more applications 106 using a protocol stack 104, such as, for example, an Internet protocol stack (e.g., a TCP/IP stack), to communicate with other applications running on other communication devices connected to network 110.

As is known in the art, node 102 may include a program 112 to configure stack 104. That is, program 112 enables an administrator 101 to: (a) assign a primary addresses to a network interface (physical or virtual); (b) assign an alias address to the interface; and (c) remove an address from the interface. Accordingly, admin 101 can change the network address assigned to a network interface by using program 112 to remove the currently assigned primary address from the interface, assign a new primary address to the interface, and assign to the interface the removed address as an alias address. In some embodiments, program 112 is the ifconfig utility. Ifconfig is short for "interface configurator."

A problem with using the ifconfig utility (or other similar utility) to change the address assigned to an interface is that applications 106 that, at the time of the change, have established connections that use the address are not notified of the change, and thus, must discover the change themselves. Additionally, even if an application 106 were able to discover that a change has occurred, the application 106 may not be able to determine the new address.

To overcome this problem, node 102 includes an address change service (ACS) 121. While service 121 is shown being separate and apart from program 112, this was done solely for the sake of illustration as it is contemplated that program 112 could be modified to include address change service 121.

In some embodiments, admin 101 can directly use service 121 to change the address assigned to an interface much in the same way that today admin 101 can directly use ifconfig 112 to change the address assigned to an interface. However, service 121 is configured such that, in response to service 121 receiving information indicating that admin 101 desires to change the address of the interface from an existing address to a new address (e.g., receiving a change command from admin 101 or from a maintenance system 190), service 121 provides a notification to all of (or a subset of) the applications 106 that are using the existing address so that the notified applications 106 can take necessary measures (e.g., terminate a connection and/or establish a new connection).

The notification that is provided to the applications 106 may include the new address so that the applications will be made aware that not only has a change taken place, but also made aware of the new address. In some embodiments, the notification is only sent to those applications 106 that have "subscribed" to a notification service for the network interface (or to a subset of the "subscribers").

The ability to split the subscribers into subsets (e.g. two or more subsets) allows for advanced controlled network reconfiguration. For example, two subscribing applications (application A and application B) that share the same network address could, in runtime, be reconfigured to be separated addressing wise (i.e., use two individual IP destination addresses). For example, it may be desired to reconfigure the system so that application B uses an address that is different than the address it shares with application A. This can be accomplished by, for example, having admin 101 use service 121 to specify the new address that application B should use and cause service 121 to send a notification to application B, but not application A. The notification, which may include information identifying the new address, should cause application B to, for example, close gracefully all of the connections it has open that use the old address and reestablish those connections using the new address.

In other embodiments, applications 106 can still be notified of changes to stack 104 even when admin 101 uses program 112 to configure stack 104 because node 102 includes an interface monitor 123 that monitors stack 104 and communicates with service 121. For example, in some embodiments, interface monitor 123 is configured to monitor stack 104 for the purpose of detecting a specific event that indicates that admin 101 desires to change the configuration of a network interface (e.g., detect a pattern of IP address alterations to an interface activated through conventional procedures) and, in response to detecting the event, provide information about the event to service 121, which uses the information to notify one or more applications that an interface change is underway.

More specifically, in some embodiments, monitor 123 is configured to detect the following changes to an interface: (1) the removal of an address from the interface; (2) the assigning of a new address to the interface; and (3) the assigning of the removed address to the interface as an alias address. In response to monitor 123 detecting that these three actions have occurred within some time window, monitor 123 may signal service 121 that an interface address change is underway. For example, monitor 123 may provide to service 121 the removed address and the new address. In response, 121 may use this information to notify one or more applications 106 that an address change is underway. Thus, the application 106 can take necessary measures (e.g., gracefully terminating connections that use the removed address and initiate new connections). As discussed above, in some embodiments, the notification is sent only to those applications 106 that have "subscribed" to the notification service for the network interface.

The new connections that are initiated by application 106 in response to receiving the notification from service 121 will use the new address. This can be done, for example, by application 106 binding to the new address in the socket interface. It can also be done automatically by stack 104 (i.e., stack 104 will choose the new address as the source address for the connection).

Incoming connections from a remote application to application 106 should, of course, use the new IP address. This can be done by notifying the remote application of the new address or can be handled by other layers (e.g. through the domain name system (DNS)) or through manual intervention by manually reconfiguring the remote application in response to the notification.

An application 106 should be able to keep a socket open during the process of address change, but should denying incoming connection requests (e.g. TCP SYN) to the old IP address (i.e., denied or discarded for a period covering the change). This way, the connections to the old IP address will not grow and consume resources. This can be done by a temporary IP-filter or a temporary route to a "black hole interface" which discards the traffic. An Internet control message protocol (ICMP) message could also be sent back to originator if needed. Once the controlled IP address is completed, then the above temporary measures may be removed. The application 106 could also discard the connection if it recognizes that it is to the wrong IP address but this will make, for example, a layer of stack 104 (e.g., a TCP layer) go through its states and end up in TIME_WAIT state. It is also possible for the application 106 to simply close the listening socket upon receiving the notification, thereby preventing the establishment of new connections. It is also possible notify applications about the address change and then set the new IP address and remove the old one. The applications will then decide what to do with the old already established connections (that are no longer working).

In some embodiments, an address change handler (ACH) application programming interface (API) is provided so that applications 106 can react to an address change notification in the following ways: controlled shutdown of sockets, restart process or create new communication endpoint (e.g. SCTP). Another option is to give the applications a warning before the actual address change starts. The address change would then be implemented as a delayed event which could start after given time or when the application signals back that they are ready, for example, when they have closed all external communication sessions.

Figure 2:
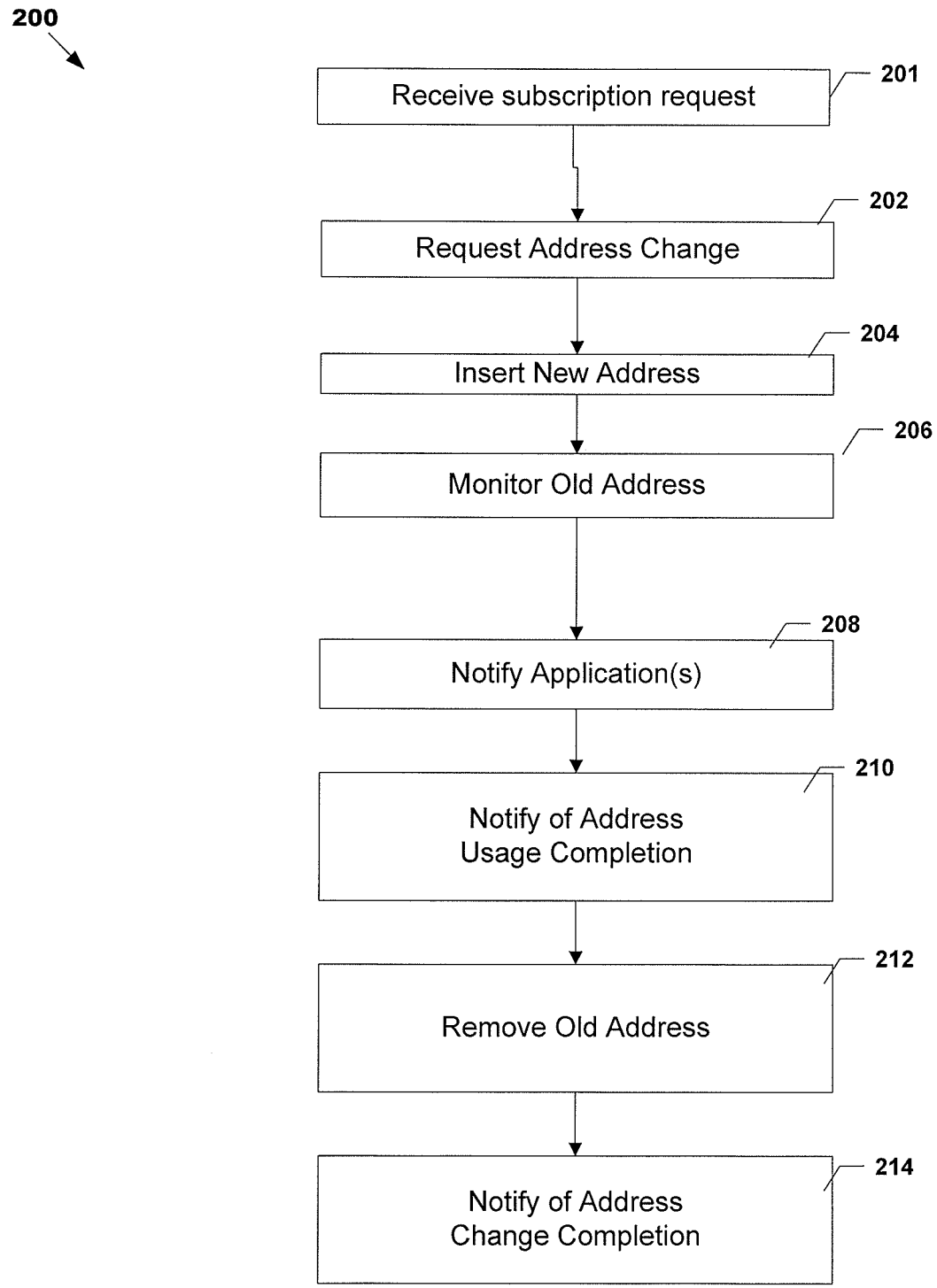
FIG. 2 is a flow chart illustrating a process according to some embodiments of the invention.

Referring now to FIG. 2, FIG. 2 is a flow chart illustrating a process 200 according to some embodiments of the invention. Process 200 may begin in step 201, where service 121 receives a subscription request 301 (see FIG. 3) from a subscriber (e.g., an application 106 or an application monitor 192). Request 301 may identify an address or interface for which the subscriber would like to receive notifications. Alternatively, request 301 may simply contain a subscriber identifier associated with the subscriber.

In step 202, admin 101 (a.k.a., operator 101) requests an address change. For example, admin 101 may send an address change request message 302 to maintenance system 190 (a.k.a., O&M 190) that may include information identifying node 102, an interface in node 102, a new address to be assigned to the identified interface, and one or more subscriber identifiers. In response, maintenance system 190 transmits an address change request message 303 to service 121. Message 303 may include information identifying an interface in node 102, the new address to be assigned to the identified interface, and the subscriber identifiers. If node 102 only has one interface, then message 303 need not include information identifying the interface. In some embodiment, admin 101 can interface directly with service 121 using, for example, a graphical user interface provided by service 121. That is, it is not necessary for admin 101 to use maintenance system 190 to provide to service 121 an address change request.

In response to message 303, service 121: (a) adds the new address to the interface by, for example, providing an insert new address message 304 to stack 104 (step 204); (b) transmit a monitor connections message 306 to a connection tracking service 122 (a.k.a., CTS 122), which monitors connections that use the old address that the new address is intended to replace (step 206); and (c) provides a notification message 308 to a set of subscribers (e.g., the subscribers identified by the subscriber identifier(s) and/or the subscribers that indicated they want to receive a notification whenever the old address is removed from the interface or the interface is modified) (step 208). Monitor connections message 306 may include the old address. Notification message 308 may include the new address and the old address. The subscriber, in response to notification 308, decides what actions to take as described herein.

As mentioned above, in response to message 306, CTS 122 will monitor some or all of the established connections that use the old address. CTS 122 may accomplish this by interrogating stack 104, which, in some embodiments, maintains a connection table. CTS 122 may be configured to transmit to service 121 a notification 310 once (a) a timeout has occurred (i.e., a certain amount of time has elapsed since CTS 122 received message 306) or (b) all of the monitored connections are closed, whichever occurs first. That is, CTS 122 may be configured to send a notification 310 to service 121 as soon as the usage of the old address is complete (step 210). Preferably, notification 310 indicates whether notification 310 was sent as a result of the timeout or as a result of detecting that all of the monitored connections are closed.

In response to receiving notification 310, service 121 may remove the old address from the interface by, for example, providing a remove address message 312 to stack 104 (step 212). For example, in embodiments where all applications that use the old address are notified, it may be desirable to remove the old address. However, in embodiments where less than all the applications are notified it may be desirable to not remove the old address. For instance, there may be an embodiment were two applications use the same address and an administrator would like to migrate just one of the applications to a new address. In such an embodiment, step 212 may be skipped.

Next (step 214), service 121 may notify admin 101 that the address change is complete. For example, in step 214, service may transmit a notification message 314 to O&M 190, which may then provide to admin 101 a notification 315 that informs admin 101 that the address change is complete. Alternatively to performing steps 212 and 214, service 121 may signal an error condition if notification 310 indicates that a timeout occurred.

Figure 3:
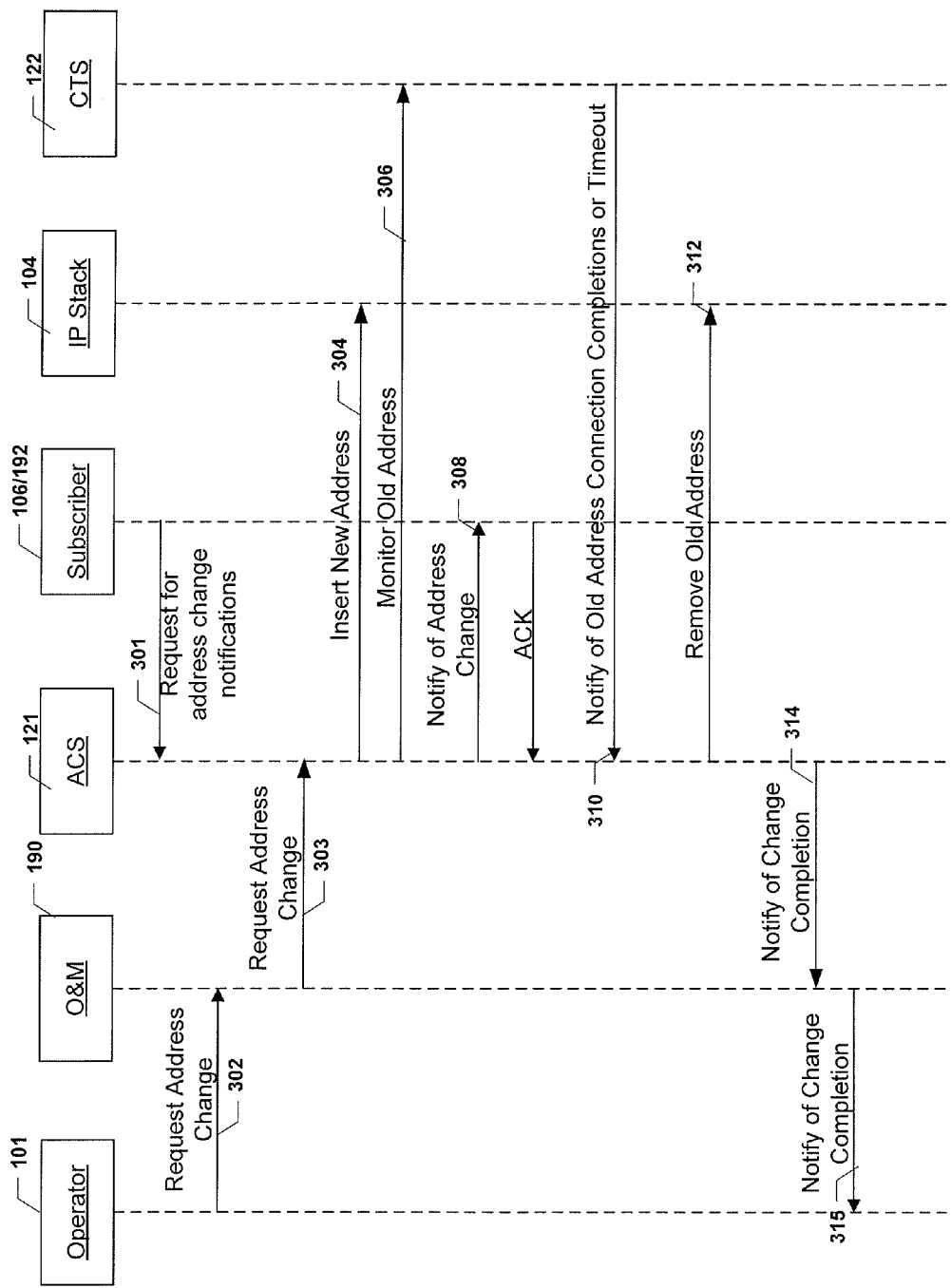
FIG. 3 is a data flow diagram illustrating a data flow according to some embodiments of the invention.
Figure 4:
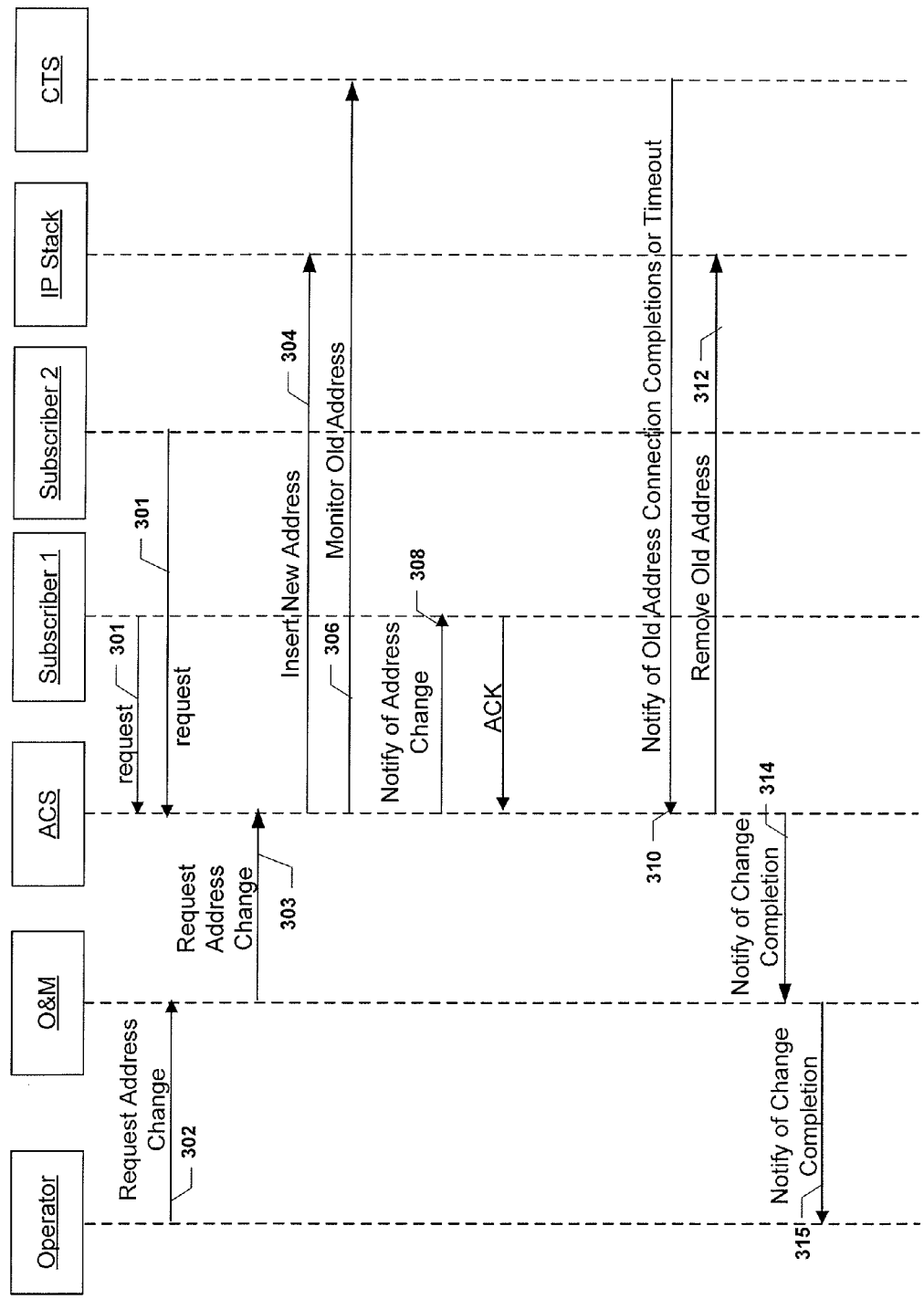
FIG. 4 is a data flow diagram illustrating a data flow according to some embodiments of the invention.

Referring now to FIG. 4, FIG. 4 is a data flow diagram that is very similar to the data flow diagram shown in FIG. 3. The difference is that FIG. 4 shows multiple subscribers subscribing to the notification service. FIG. 4 also shows that the address change notification message is sent only to a subset of the subscribers. Of course, in some embodiments, the notification is sent to all subscribers.

Figure 5:
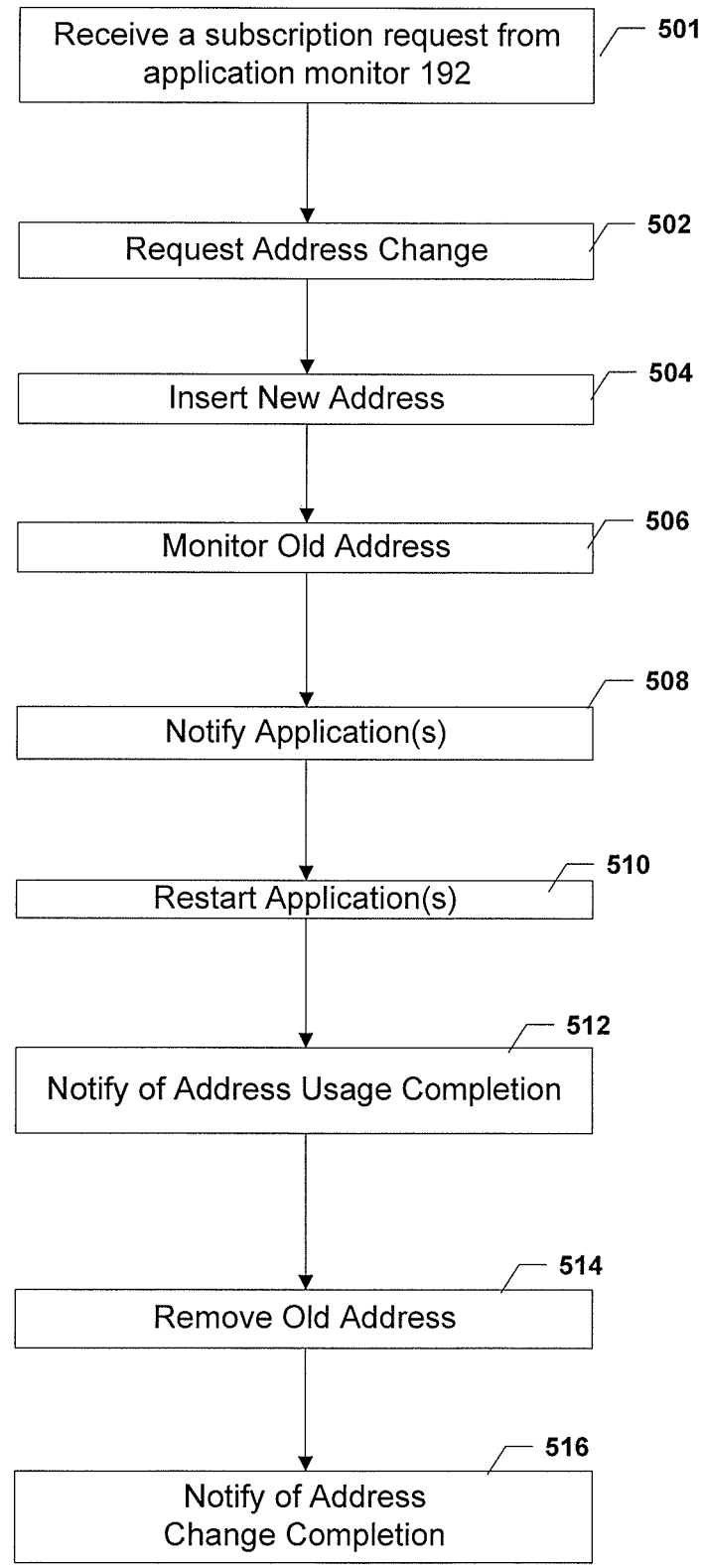
FIG. 5 is a flow chart illustrating a process according to some embodiments of the invention.
Figure 6:
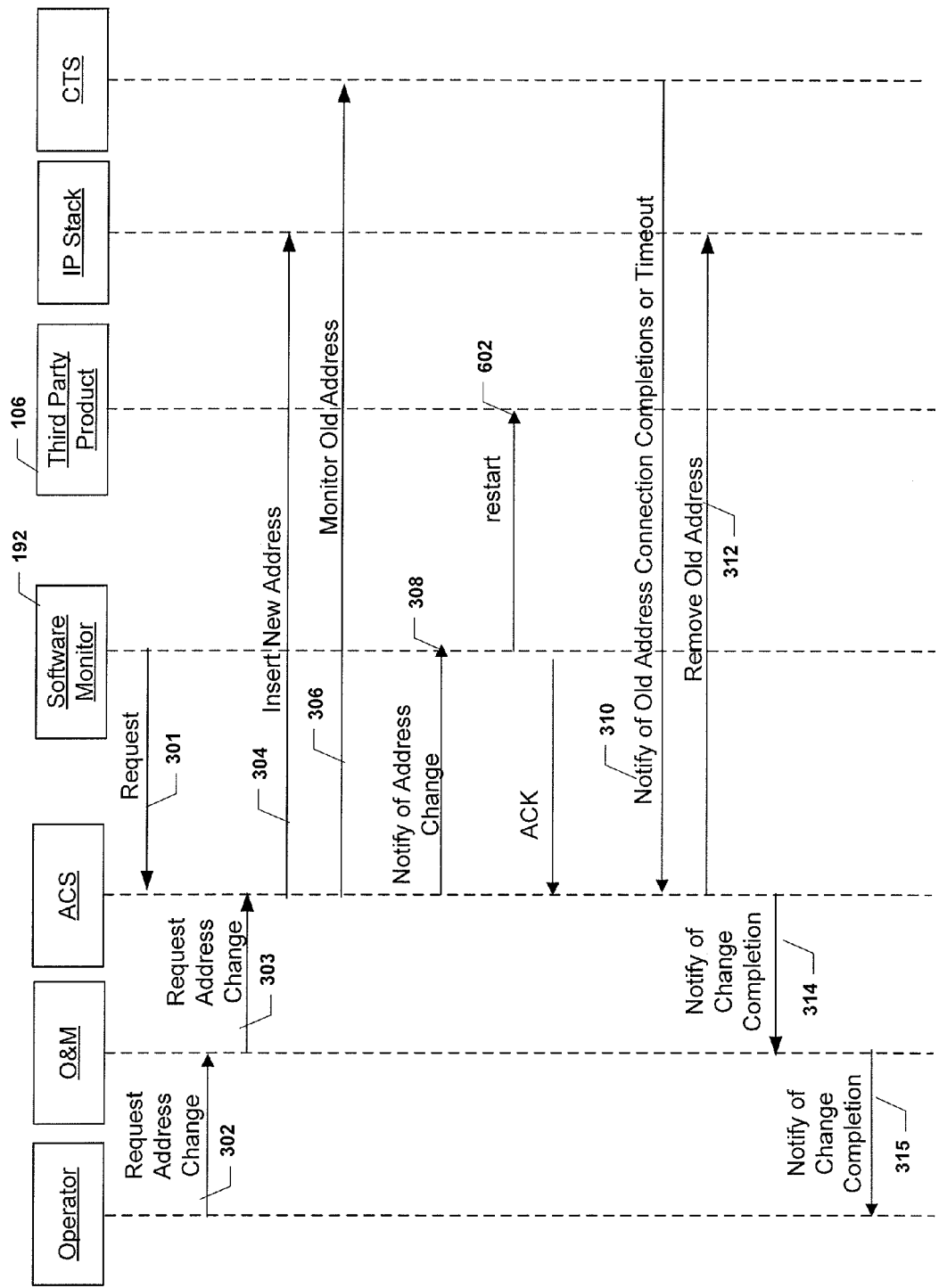
FIG. 6 is a data flow diagram illustrating a data flow according to some embodiments of the invention.

Referring now to FIG. 5, FIG. 5 is a flow chart illustrating a process 500 according to some embodiments of the invention. Process 500 may begin in step 501, where service 121 receives a subscription request 301 (see FIG. 6) from an application monitor 192. Request 301 may identify an address or interface for which monitor 192 would like to receive notifications. In step 502, admin 101 requests an address change (see FIG. 6, message 302). In response, maintenance system 190 transmits an address change request message 303 to service 121.

In response to message 303, service 121: (a) adds the new address to the interface (step 504); (b) transmit a monitor address message 306 to CTS 122 (step 506); and (c) provides a notification message 308 to monitor 192 (step 508). Monitor 192, in response to notification 308, causes one or more applications 106 (e.g., legacy applications or third party applications that are not capable of being subscribers to the notification service) to restart (step 510). For example, in step 510, monitor may cause a kill signal 602 (e.g., a SIGKILL signal) to be sent to the one or more applications. After terminating the one or more applications 106, monitor 192 may restart the applications. When restarted, the applications should use the new address.

As discussed above, in response to message 306, CTS 122 monitors some or all of the established connections that use the old address and sends a notification 310 to service 121 as soon as the usage of the old address is complete (step 512).

In response to receiving notification 310, service 121 removes the old address from the interface by, for example, providing a remove address message 312 to stack 104 (step 514). Next (step 516), service 121 may notify admin 101 that the address change is complete.

Figure 7:
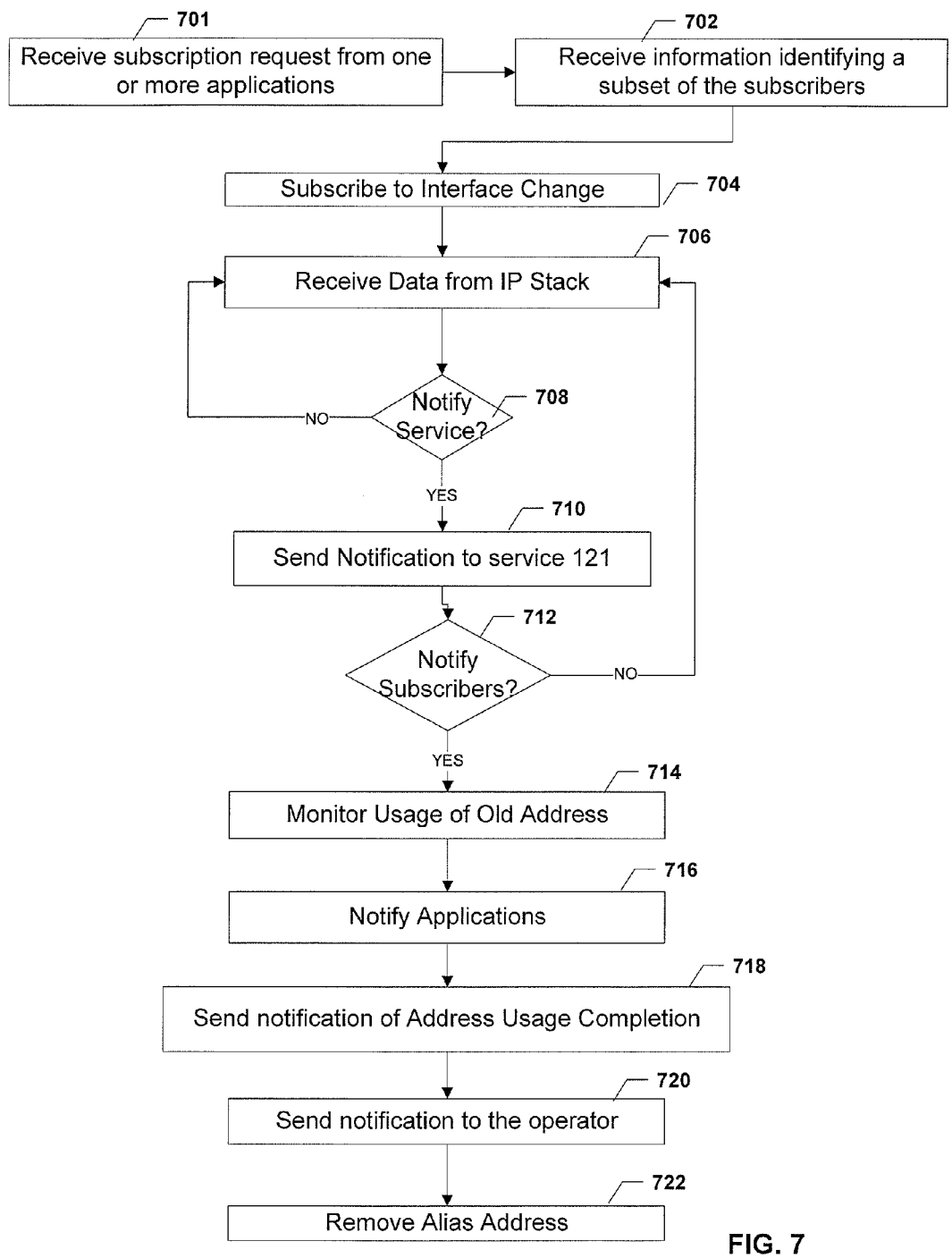
FIG. 7 is a flow chart illustrating a process according to some embodiments of the inventions.

Referring now to FIG. 7, FIG. 7 is a flow chart illustrating a process 700 according to some embodiments of the invention. Process 700 may being in step 701, where service 121 receives a subscription request 301 (see FIG. 8) from a set of one or more subscribers (e.g., an application 106 or an application monitor 192).

In step 702, service receives from operator 191 information 802 identifying a subset of the subscribers (e.g., all of the subscribers or less than all of the subscribers). Information 802 may also identify an address.

In step 704, interface monitor 122 ("IM" 122) subscribes to an interface change notification service provided by stack 104 (e.g., IM 122 may send to stack 104 a subscribe message 804 that identifies an interface).

Figure 8:
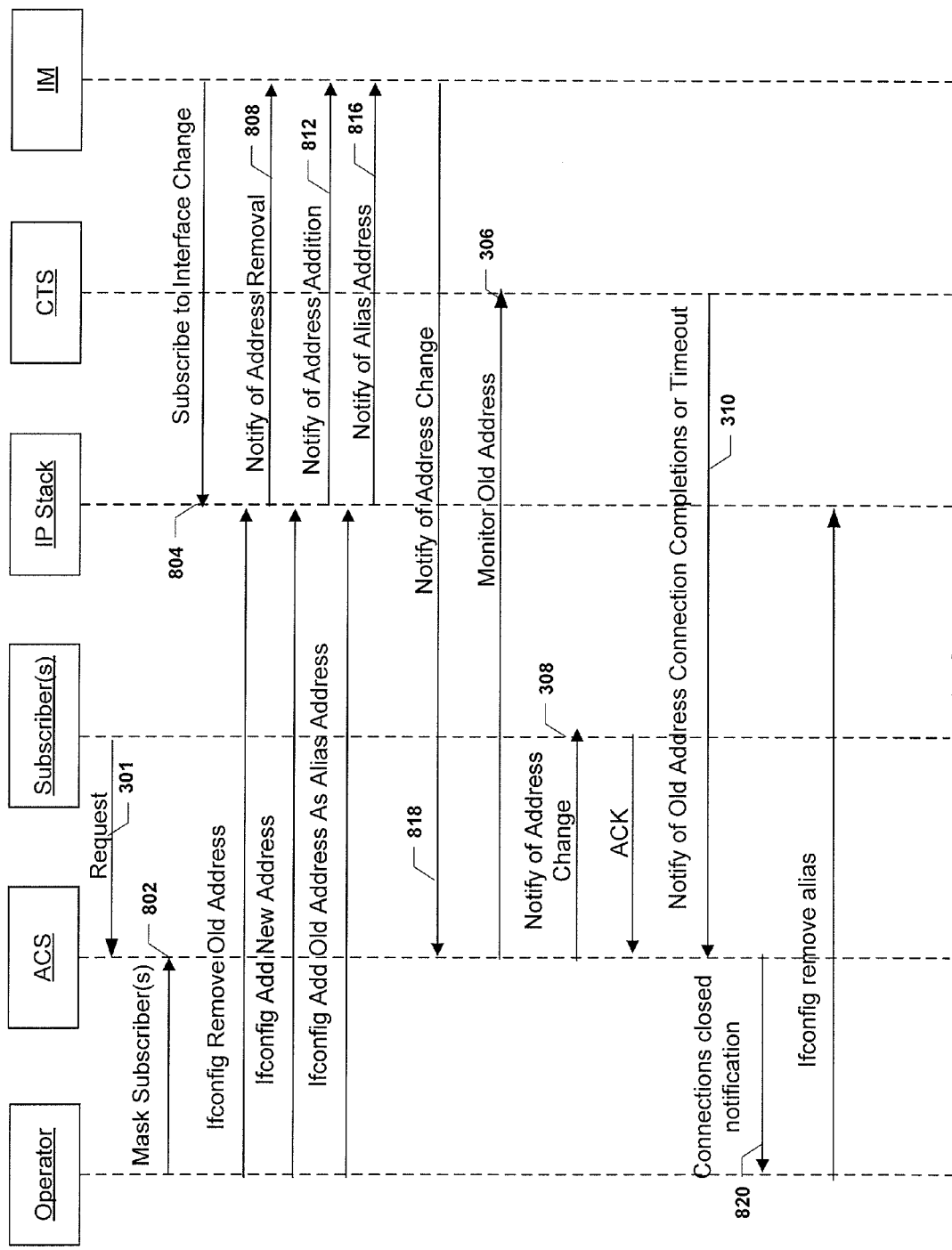
FIG. 8 is a data flow diagram illustrating a data flow according to some embodiments of the invention.

In step 706, IM 122 receives notifications from stack 104 when changes to the subscribed to interface occur. For example, as illustrated in FIG. 8, if we assume operator 101 uses, for example, utility 112 to (a) remove an address from the interface (the "old address"), (b) add a new address to the interface, and (c) add the old address to the interface as an alias, then stack 104 will provide notifications 808, 812 and 816 to IM 122.

In step 708, IM 122 determines, based on information received from stack 104, whether service 121 should be notified that an address change has occurred. For example, IM 122 may be configured such that it determines that service 121 should be so notified immediately after IM 122 receives the following set of notifications: notifications 808, 812 and 816.

If IM determines that service 121 need not be notified the process may return to step 706, otherwise it may proceed to step 710. In step 710, IM 122 send to service 121 a notification of address change message 818. Message 818 may include the new address and the old address.

In response to message 818, service 121 determines whether the old address identified in message 818 matches the address included in message 802 (step 712). If it does, then process proceeds to step 714, otherwise it may return to step 706.

In step 714, service 121 transmit a monitor connections message 306 to CTS 122, which, in response, monitors connections that use the old address. Message 306 may include information identifying the old address so that CTS 122 will know which connections need monitoring.

In step 716, service 121 provides a notification message 308 to a set of subscribers (e.g., the subscribers identified by the information in message 802 and/or the subscribers that indicated they want to receive a notification whenever the old address is removed from the interface or the interface is modified).

In step 718, CTS 122 transmits to service 121 a notification 310 once (a) a timeout has occurred or (b) all of the monitored connections are closed, whichever occurs first. In response to notification 310 indicating that all of the monitored connections are closed, service 121 provides a connections closed notification 820 to operator 101 (step 720). Notification 820 informs operator 101 that is "safe" to remove the alias from the interface. Accordingly, in response to notification 820, operator 101 may use utility 112 to remove the alias (step 722).

Figure 9:
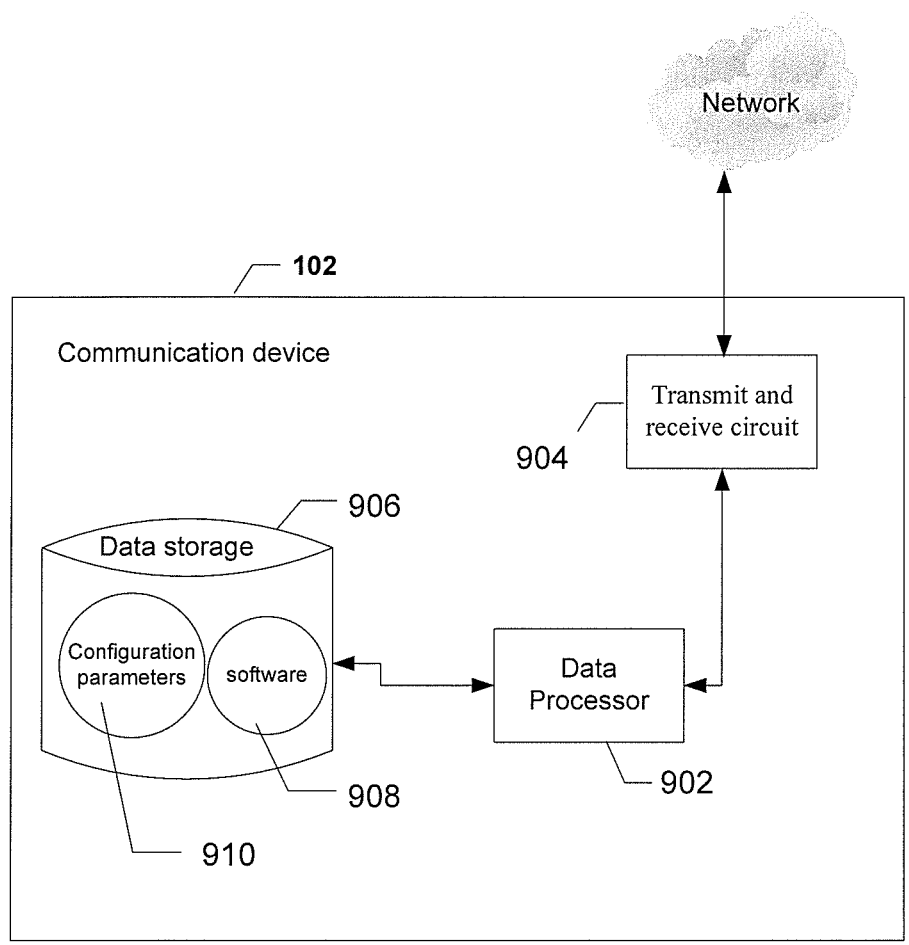
FIG. 9 is a functional block diagram of a communication device according to some embodiments.

Referring now to FIG. 9, FIG. 9 is a functional block diagram of node 102 according to some embodiments of the invention. As shown, node 102 may comprise a data processing system 902 (e.g., one or more microprocessors), a data storage system 906 (e.g., one or more non-volatile and/or volatile storage devices) and computer software 908 stored on the storage system 906. Configuration parameters 910 (e.g., the above mentioned timeout values and tables) may also be stored in storage system 906. Node 102 also includes transmit/receive (Tx/Rx) circuitry 904 for transmitting data to and receiving data from network 110. Software 908 is configured such that when processor 902 executes software 908, node 102 performs steps described above with reference to the flow charts and data flow diagrams.

Figure 10:
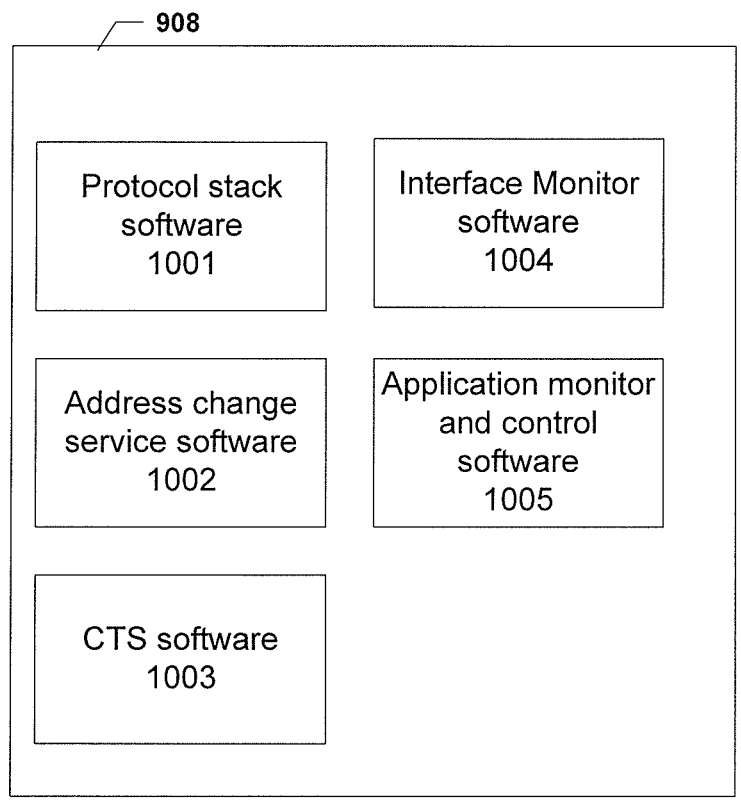
FIG. 10 is a functional block diagram of software application according to some embodiments.

Referring now to FIG. 10, FIG. 10 is a functional block diagram of software 908. As shown in FIG. 10, software may include: computer instructions 1001 that implement some or all of the layers of protocol stack 104; computer instructions 1002 that implement service 121 (e.g., computer instructions that perform the steps described herein that are performed by service 121); computer instructions 1003 that implement CTS 122; computer instructions 1004 that implement IM 123; and computer instructions 1005 that monitor 192.

While various embodiments of the present invention have been described above, it should be understood that they have been presented by way of example only, and not limitation. Thus, the breadth and scope of the present invention should not be limited by any of the above-described exemplary embodiments.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

What is claimed is:

1. In a first network node having a network interface to which a first network address is assigned, a method of reconfiguring the network interface, the method comprising:

receiving information indicating that an operator desires to remove the first network address from the network interface and/or assign a second network address to the network interface; and in response to receiving the information, providing a notification to a first application executing in the first network node and using the network interface and a protocol stack of the first network node to communicate with a second application executing on a second network node such that the first application can take a necessary measure, wherein the step of receiving the information that indicates that an operator desires to remove the first network address from the network interface and assign a second network address to the network interface comprises:

(1) receiving, from a protocol stack, information indicating that an operator has removed the first network address from the network interface and added the second network address to the network interface; and (2) after step (1), receiving, from the protocol stack, information indicating that an operator has assigned the first network address to the network interface as an alias.

2. The method of claim 1, wherein the information comprises a command received from an external node or directly from the operator, and the first network address is not removed from the network interface until after the notification is provided to the first application.

3. The method of claim 1, wherein the information includes the second network address and the notification provided to the first application includes the second network address.

4. The method of claim 3, wherein the information further includes the first network address and/or a subscriber identifier, wherein the first application is associated with the first network address and/or the subscriber identifier.

5. The method of claim 1, further comprising monitoring connections that are using the first network address.

6. The method of claim 5, wherein
the step of monitoring the connections comprises detecting when a connection using the first network address is closed, and
the method further comprises removing the first network address from the network interface only after (1) all of the monitored connections have been closed or (2) a predetermined period of time has elapsed.

7. The method of claim 1, wherein the information includes (a) the second network address and (b) (1) a subscriber group identifier or (b)(2) the first network address, wherein a set of two or more computer programs is associated with the subscriber group identifier and/or the first network address.

8. The method of claim 7, further comprising providing the notification to at least a subset of the computer programs included in the set of computer programs.

9. The method of claim 1, wherein the step of providing a notification comprises sending a signal to the first application.

10. The method of claim 1, wherein the network node comprises a plurality of computer programs executing in the node that are utilizing the first network address, and the notification is sent to less than all of the plurality of computer programs.

11. The method of claim 1, wherein the step of receiving the information that indicates that an operator desires to remove the first network address from the network interface and assign a second network address to the network interface comprises:
receiving information indicating that an operator has removed the first network address from the network interface and added the second network address to the network interface.

12. The method of claim 1, wherein the step of receiving the information that indicates that an operator desires to remove the first network address from the network interface and assign a second network address to the network interface comprises:
receiving information indicating that an operator has assigned the first network address to the network interface as an alias.

13. The method of claim 1, wherein the method further comprises removing the first network address from the network interface after a predetermined period of time has elapsed.

14. The method of claim 5, wherein
the step of monitoring the connections comprises detecting when a connection using the first network address is closed, and
the method further comprises removing the first network address from the network interface after all of the monitored connections have been closed.

15. The method of claim 1, wherein the information includes (a) the second network address and (b) a subscriber group identifier, wherein a set of two or more computer programs is associated with the subscriber group identifier.

16. The method of claim 1, wherein the information includes (a) the second network address and (b) the first network address.

* * * * *